Feb. 9, 1965  O. C. NIEDERER ETAL  3,168,950
EGG HANDLING EQUIPMENT
Original Filed Jan. 11, 1960  2 Sheets-Sheet 1
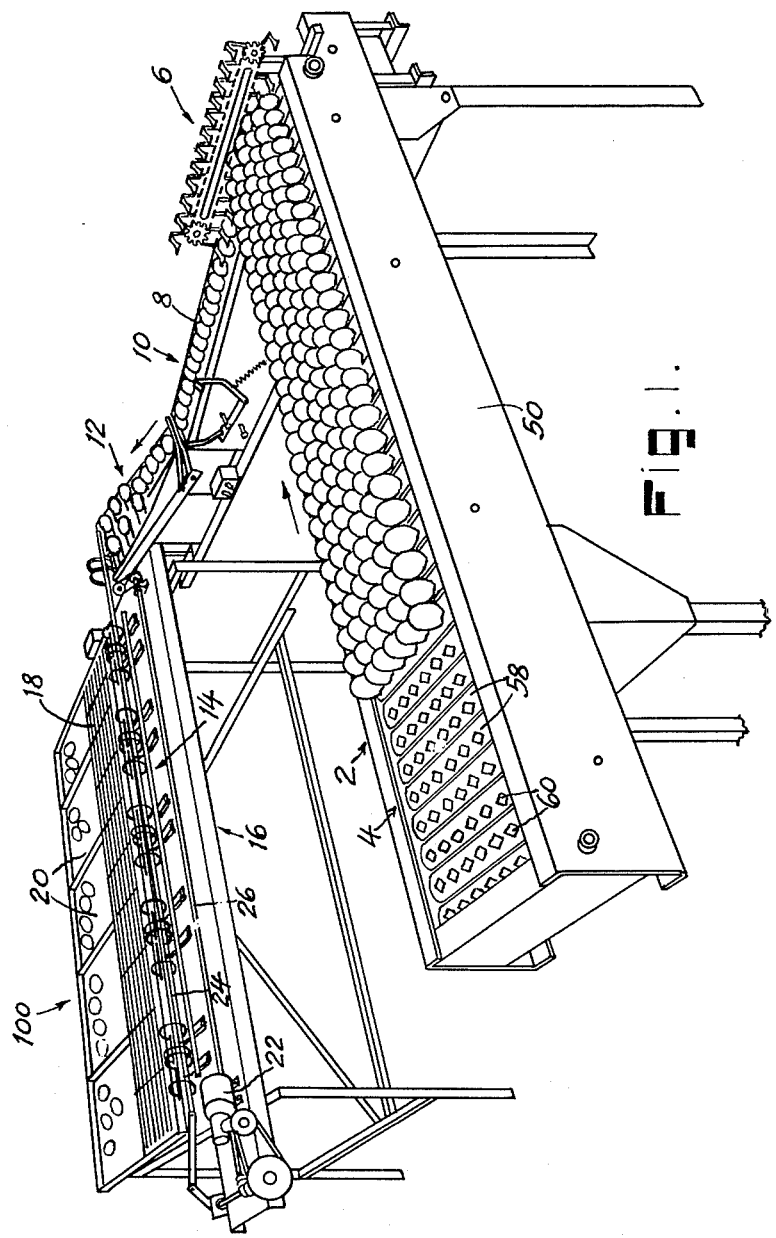
INVENTORS
OTTO C. NIEDERER
BY HERBERT O. NIEDERER
Albert Sperry
ATTORNEY Feb. 9, 1965     O. C. NIEDERER ETAL     3,168,950
EGG HANDLING EQUIPMENT
Original Filed Jan. 11, 1960     2 Sheets-Sheet 2
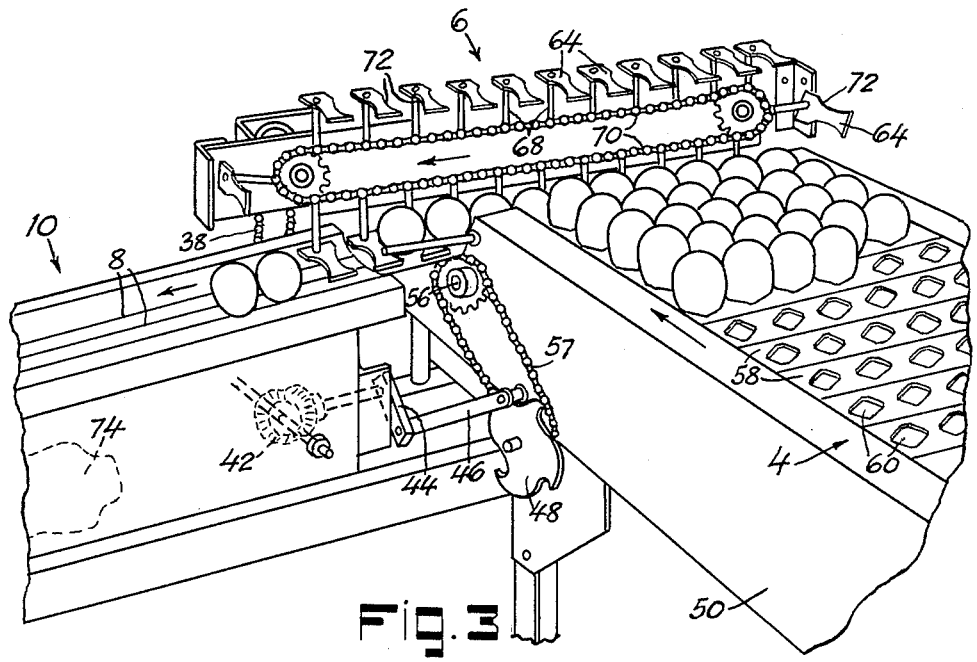
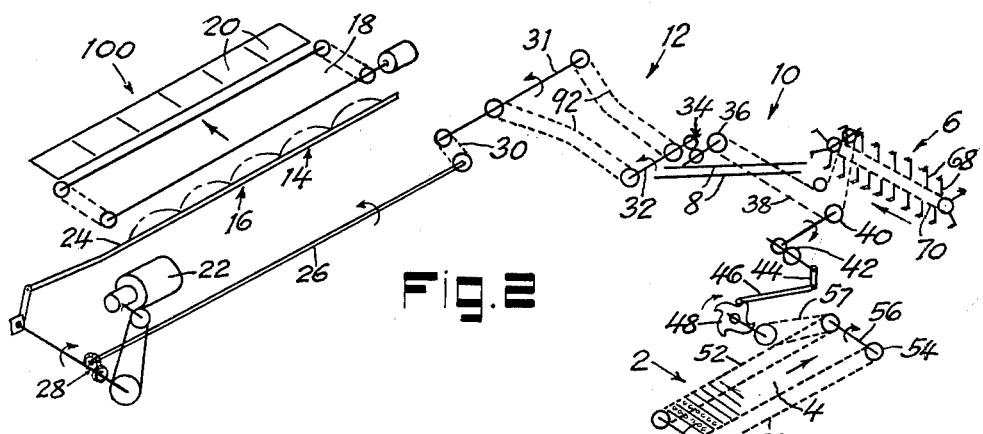
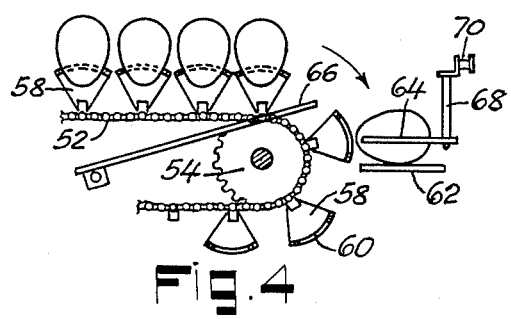
INVENTORS
OTTO C. NIEDERER
BY HERBERT O. NIEDERER
Albert Sperry
ATTORNEY 3,168,950
EGG HANDLING EQUIPMENT
Otto C. Niederer, Bear Tavern Road, and Herbert O. Niederer, Church Road, both of Titusville, N.J.
Original application Jan. 11, 1960, Ser. No. 1,741, now Patent No. 3,077,257, dated Feb. 12, 1963. Divided and this application Jan. 22, 1963, Ser. No. 253,086
2 Claims. (Cl. 198—32)

This invention relates to egg handling equipment and is directed particularly to egg conveying means whereby the rate and manner in which the eggs are moved at different stations along a path of travel are varied to permit the most efficient handling thereof. This application is a division of our copending application Serial No. 1,741, filed January 11, 1960, now Patent 3,077,257, issued Feb. 12, 1963.

In the handling of eggs in modern plants, it is frequently necessary to transfer a full tray, consisting of 30 eggs, from one point to another whereas the operations of candling and grading eggs requires each egg to be inspected and weighed separately. Moreover, the rate at which eggs can be passed through a candling station and a weighing station is not always the same as the rate at which they can be handled at loading and packing stations. For this reason, it is frequently found that eggs will accumulate at one station while other stations are waiting for eggs. Moreover, in the candling of eggs it has been found that the candling operation can be speeded up considerably if the eggs are arranged so that the larger ends thereof in which the air cell is present are always disposed at the same side of the candler. This arrangement of the eggs simplifies inspection and assures greater accuracy in candling the eggs.

In accordance with the present invention, novel means are provided for transferring eggs smoothly and continuously from one station to another for performing different operations thereon, whereas the rate and manner in which the eggs are moved at each station is coordinated and adapted to the conditions or types of equipment located at each station. The construction is particularly designed so as to arrange the eggs in the best position for candling.

In the preferred form of the equipment described herein, the eggs are received in bulk, that is in groups of 30 at a time, and are placed on a conveyor with their larger ends upward as they are transferred from a crate or flats at a loading station. The eggs are then arranged and transferred for movement in single file through an egg candling station with the larger ends of the eggs located on the same side of the candler for speedier and more accurate candling. From the candler, the eggs are supplied in multiple rows to egg grading or other equipment. The movement of the eggs is such that each station may operate at the most efficient speed without accumulation or lack of eggs at any location.

Accordingly, the principal object of the invention is to provide novel egg handling or transfer means whereby a continuous and uniform flow of eggs may be maintained through various stations and operations.

Another object of the invention is to provide novel conveying means for eggs whereby the rate and manner of movement of the eggs at different point will automatically be varied.

A specific object of the invention is to supply eggs to a candler with the larger ends of all of the eggs positioned on the same side of the candler.

Another specific object of the present invention is to provide novel means for receiving eggs in bulk and causing said eggs to be transferred for movement in single file and in predetermined alignment.

These and other objects and features of the present invention will appear from the following description thereof wherein reference is made to the accompanying figures of the drawings.

In the drawings:

FIG. 1 is a perspective showing a typical egg handling system embodying the present invention;

FIG. 2 is a diagrammatic illustration showing the driving connections employed in the assembly of FIG. 1;

FIG. 3 is an enlarged view showing a portion of the receiving and aligning conveyors embodied in the assembly of FIG. 1; and FIG. 4 is a sectional view through a portion of the construction shown in FIG. 3.

In that form of the invention chosen for purposes of illustration in the drawings, the assembly includes a loading station 2 where groups or trays of eggs are deposited on a receiving conveyor 4 with their larger ends upward. The eggs are transferred from the delivery end of the receiving conveyor to an aligning conveyor 6 which arranges the eggs in single file and holds the larger ends thereof facing in the same direction. From the aligning conveyor 6 the eggs are caused to move by gravity over tracks 8 at a candling station 10 with their larger ends positioned on one side of the candler. From the candling station 10 the eggs are moved by a dividing conveyor 12 into two rows which are fed to a dual egg grader 14 at the grading station 16. From the grading station 16 the eggs are moved by a take-away conveyor 18 to the trays 20 at a packing station.

The movement of the eggs to and through each station not only takes place continuously but involves a different arrangement and speed of movement of the eggs at each station for the most efficient handling thereof. A single source of power, such as the motor 22 which drives the egg grader, may be used to coordinate the operation of all of the elements of the assembly. Thus, as shown in FIG. 2, the egg grader may be of the type shown in Patent No. 2,246,597 and motor 22 may be used to actuate the grader conveyor bar 24. At the same time, the motor 22 may drive the shaft 26 through bevel gears 28. The shaft 26 is provided at its opposite ends with a chain 30 for driving the shaft 31 of dividing conveyor 12. The dividing conveyor 12 embodies chains 92 which drive shaft 32 at the lower end of the dividing conveyor 12. Chains 92 pass about sprockets on a shaft 32 to which a spur gear 34 is secured. Spur gear 34 drives the sprocket 36 about which a chain 38 passes for actuating the aligning conveyor 6. At the same time, the chain 38 passes about the sprocket 40 which drives bevel gears 42 to actuate crank 44 for operating ratchet arm 46 and ratchet wheel 48 whereby the receiving conveyor 4 is caused to advance step by step when the aligning conveyor 6 has discharged its eggs onto the tracks 8 of the candling station 10.

The driving connections shown and described are illustrative of those which can be used and have been found in practice to assure uniform operation of all the elements of the assembly so as to maintain the desired supply of eggs at each station without any accumulation or jamming of the eggs at any point. However, other driving connections may, obviously, be substituted for those shown. Thus, if desired, each of the elements of the assembly may be individually driven by respective motor and gear combinations.

In the preferred form of the invention shown in the drawings, the receiving station is in the form of a table 50 having the receiving conveyor 4 arranged horizontally near the top thereof. The receiving conveyor has chains 52 at opposite sides thereof which extend about a sprocket 54 at the delivery end thereof. The sprocket 54 is secured to the shaft 56 to which ratchet wheel 48 is attached through chain 57. Therefore, when the ratchet wheel is advanced by operation of ratchet arm 46, the upper run of the receiving conveyor is advanced one step to transfer six eggs at a time from the receiving conveyor 4 to the aligning conveyor 6. For this purpose, the chains 52 of the receiving conveyor are provided with a plurality of transversely extending slats 58 having egg receiving openings 60 therein. These slats, when positioned side by side on the upper run of the conveyor, present egg receiving openings arranged to receive groups of eggs in the same arrangement as they are carried by crates, flats or conventional egg lifting means.

Eggs are normally arranged in egg cases or on flats with the larger end of each egg facing upward. Therefore, the eggs can be transferred onto the receiving conveyor in bulk or groups with the larger ends thereof upward without requiring special handling of the eggs. As the slats 58 pass about the sprocket 54 with the chain 52 they tilt each row of eggs forward so that the eggs fall outward onto a platform 62 between the plates 64 of the aligning conveyor 6, as best seen in FIG. 4. The larger ends of the eggs are, therefore, positioned on the far side of the platform 62 and are prevented from turning end for end by means of the plates 64 of the aligning conveyor. A blocking bar 66 may be positioned beneath the slats 58 where they pass about the sprockets 54 to prevent small eggs from falling between the slats as they spread apart while dumping the rows of eggs onto the aligning conveyor. It is found in practice that the blocking bar 66 does not cause the eggs to turn end for end as they are transferred from the receiving conveyor to the aligning conveyor.

As best seen in FIG. 3, the plates 64 of the aligning conveyor 6 are carried by posts 68 secured to the chain 70 and extend substantially perpendicular to the path of travel of chain 70, projecting downward from the lower run of the chain 70 into positions parallel to the platform 62. The adjacent sides of the plates 64 are cut away as shown at 72 so that they cooperate to form egg guiding recesses which serve to hold the rows of eggs deposited on platform 62 with their long axes parallel and with their larger ends on the far side of the conveyor as they are advanced by movement of the aligning conveyor 6 toward the discharge end thereof.

As the plates 64 of the aligning conveyor reach the discharge end of the lower run, the posts 68 on chain 70 swing each plate upward and away from the adjacent horizontal plate to provide room for discharge of the egg carried between the adjacent plates, while the following plate pushes the egg forward to discharge the egg from the aligning conveyor 6. In this way, the eggs are pushed forward one after another in predetermined spaced relation and are discharged in single file with the larger ends thereof arranged on a common side onto the inclined tracks 8 of the candler 10 or other suitable egg receiving means.

It will be apparent that the aligning conveyor 6 is not limited in use to transferring eggs from the receiving conveyor 4 to the candler 10 but, instead, may be employed in connection with substantially any type of egg processing equipment where it is desired to supply the eggs to such equipment in single file with the long axes of the eggs transverse to the direction of movement and with the larger ends thereof arranged on a common side. The aligning conveyor 6 is also useful in any operation wherein it is desired to space the eggs predetermined distances apart or to regulate their rate of movement from one position to another.

The equipment also may be used in handling, sorting or arranging other types of articles in continuous assembly line operations. In view thereof it will be apparent that the combination and arrangement of the elements and the form and construction thereof are capable of many variations and adaptations. It should, therefore, be understood that the particular embodiment of the invention shown in the drawings and described above is intended to be illustrative only and is not intended to limit the scope of the invention.

We claim:

1. Egg handling means comprising an aligning conveyor, egg supplying means for supplying eggs to said aligning conveyor in successive rows and means for receiving eggs discharged from said aligning conveyor; said aligning conveyor comprising an endless chain, a pair of sprocket means supporting said chain substantially at right angles to said egg supplying means, means for rotating at least one of said sprocket means to cause movement of said chain, a plurality of posts secured to said chain at predetermined spaced intervals and extending substantially perpendicular to said chain, a plurality of plate members each secured to a respective one of said posts and projecting substantially perpendicular thereto, platform means positioned below the lower run of said plate members and extending parallel to said lower run to receive eggs from said egg supplying means and to support said eggs during movement of said eggs by said aligning conveyor.

2. Egg handling means comprising an aligning conveyor, egg supplying means for supplying eggs to said aligning conveyor in succesive rows and means for receiving eggs discharged from said aligning conveyor; said aligning conveyor comprising an endless chain, a pair of sprocket means supporting said chain substantially at right angles to said eggs supplying means, means for rotating at least one of said sprocket means to cause movement of said chain, a plurality of posts secured to said chain at predetermined spaced intervals and extending substantially perpendicular to said chain, a plurality of plate members each secured to a respective one of said posts and projecting substantially perpendicular thereto, said plate members being formed to cooperate with adjacent plate members to maintain eggs in predetermined axial orientation and at predetermined spaced intervals, platform means positioned below the lower run of said plate members and extending parallel to said lower run to receive eggs from said egg supplying means and to support said eggs during movement of said eggs by said plate members.

References Cited in the file of this patent

UNITED STATES PATENTS

| 2,135,778 | Wyland | Nov. 8, 1938 |
| 2,635,734 | Hampton | Apr. 21, 1953 |
| 2,684,748 | Sneed | July 27, 1954 |